US006909434B2

(12) United States Patent
Takala et al.

(10) Patent No.: US 6,909,434 B2
(45) Date of Patent: Jun. 21, 2005

(54) DISPLAY FRAME BUFFER UPDATE METHOD AND DEVICE

(75) Inventors: Janne Takala, Tampere (FI); Mikka Merilahti, Tampere (FI); Juha Heikkilā, Tampere (FI); Jouni Hietamäki, Tampere (FI); Jussi Kujanpaa , Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/157,161

(22) Filed: May 30, 2002

(65) Prior Publication Data

US 2002/0180744 A1 Dec. 5, 2002

(30) Foreign Application Priority Data

May 31, 2001 (EP) .......................................... 01113261

(51) Int. Cl.$^{7}$ .......................... G06F 13/00; G06F 13/14

(52) U.S. Cl. ....................... 345/537; 345/503; 345/519; 345/531; 345/545

(58) Field of Search ................................ 345/501, 503, 345/519, 531, 537, 545; 709/203, 217–219, 246

(56) References Cited

U.S. PATENT DOCUMENTS

| | | | | | |
|---|---|---|---|---|---|
| 5,134,697 A | | 7/1992 | Scheffler | |
| 5,847,705 A | | 12/1998 | Pope | |
| 6,041,124 A | * | 3/2000 | Sugita | 380/270 |
| 6,075,523 A | * | 6/2000 | Simmers | 345/555 |
| 6,189,122 B1 | * | 2/2001 | Cheng | 714/748 |
| 6,317,135 B1 | * | 11/2001 | Reddy | 345/519 |
| 6,331,855 B1 | * | 12/2001 | Schauser | 709/217 |
| 6,389,461 B1 | * | 5/2002 | Shah | 709/217 |
| 2001/0034770 A1 | * | 10/2001 | O'Brien | 709/217 |
| 2002/0015042 A1 | * | 2/2002 | Robotham et al. | 345/581 |

FOREIGN PATENT DOCUMENTS

| | | |
|---|---|---|
| EP | 0 645 691 A2 | 3/1995 |
| EP | 0 708 433 A2 | 4/1996 |
| EP | 0 898 264 A2 | 2/1999 |

OTHER PUBLICATIONS

European Search Report.

* cited by examiner

*Primary Examiner*—Ulka J. Chauhan
(74) *Attorney, Agent, or Firm*—Antonelli, Terry, Stout & Kraus, LLP

(57) ABSTRACT

A method for updating an integrated display frame buffer of a display module in a mobile electronic device, comprising a local frame buffer and a processor, comprising the steps of transferring display information to said local frame buffer, updating said display frame buffer by transferring said display information from said local frame buffer to said display frame buffer, and displaying said display information on said display module. Furthermore, the invention comprises the additional steps of detecting changes of said display information stored in said local frame buffer, and updating said display frame buffer when a change of said display information in said local frame buffer is detected.

9 Claims, 2 Drawing Sheets

DISPLAY FRAME BUFFER UPDATE METHOD AND DEVICE

The invention relates to the field of Application Specific Integrated Circuits (ASICs), software and displays with integrated memory. It also relates to electronic devices having smart displays. More specifically the invention relates to a method for a minimization of the display buffer updates offering power savings for mobile devices as an alternative to periodical display buffer update, in order to save battery power.

For a display with an integrated frame buffer (a smart display), the frame buffer needs to be updated every time the contents of the display (screen) are changed. If the frame buffer is located in the display module (display frame buffer), the software which is updating the screen does not have access to the display frame buffer. In these cases there is a need to have a local copy of the frame buffer which is accessible by the software (local frame buffer). The software first changes the contents of the local frame buffer. After that, the local frame buffer is copied (updated) to the display frame buffer in the display module (frame buffer update). Typically the frame buffer update is done periodically.

Previous solutions have envisaged to perform the frame buffer update periodically, regardless if the contents have changed. Also, the direct local frame buffer access has not been used widely.

U.S. Pat. No. 4,443,863 describes a data communication system for asynchronous communication having at least two data transmit/receive terminals wherein the display is periodically updated with new send or receive data. In the receive mode the data is accumulated in a receive buffer for a predetermined time interval and then transferred into a text storage buffer which then activates a display access method to process the stored data and update the display.

U.S. Pat. No. 5,134,697 describes a method and apparatus for rapidly updating a remote target display buffer memory from source display buffer memory using a communications subsystem. A method includes associating a region number with each separately modifiable display element, such as a pixel or character, in the source display buffer memory. An update indicator is associated with each region. The update indicator can be a binary flag, a counter, a shift register, or a queue containing region numbers identifying regions that have changed, or any variety of indicia capable of representing two distinguishable states.

Typically the frame buffer update is done periodically, regardless if the contents have changed or not. Thus, the problem is not really solved. If the frame-buffer is located in the display module, the software which is updating the screen does not have access to the display frame buffer. In these cases there is a need to have a local copy of the frame buffer which is accessible by the software. Continuous update of display frame buffer consumes power and decreases stand-by time of mobile terminal devices.

The frame buffer update consumes power since data is transferred between the ASIC and the display module. Continuous update of display frame buffer consumes power and decreases standby time. Therefore, the standard procedures are not suitable for the use with mobile terminal devices such as mobile phones, or handheld computers, due to low computing power, or low battery capacity.

The object of the present invention is to reduce power consumption for frame buffer update procedures in cases when the display contents are not changed. A further object of the present invention is to increase the stand-by time and also operating time.

According to a first aspect of the present invention, there is provided a method for updating an integrated display frame buffer of a display module in a mobile electronic device comprising a local frame buffer and a processor, comprising the steps of: transferring display information, e.g. from a processor to said local frame buffer, followed by updating said display frame buffer by transferring said display information from said local frame buffer to said display frame buffer, and displaying said display information on said display module. The method is characterized by the additional steps of: detecting changes of said display information stored in said local frame buffer, and updating said display frame buffer when a change of said display information in said local frame buffer is detected.

By detecting changes in the local frame buffer, the ASIC can access information about the need to update a display frame buffer of an integrated display. Therefore, the ASIC knows when it is necessary to update the display frame buffer on a "smart display". Actually an update execution element can be implemented in a hardware circuit in the ASIC, or in a software application running on the ASIC. The expression "processor" refers to a circuit on the ASIC which is capable of executing programs. The processor is also known as MCU/programmable execution unit/etc. Application specific integrated circuits may contain the local frame buffer and the processor.

Preferably the display frame buffer update method is characterized by the additional steps of: detecting, if the change in the display information is caused by an application software, running on the application specific integrated circuit, and periodically updating said display frame-buffer, if the change of the display information is caused by said application software.

A possible implementation is to have two frame buffer update modes, continuous and selective. By default, the system is in a selective update mode. In said selective mode, a display server software running on the ASIC triggers the frame buffer update when it has changed the contents of the local frame buffer. At the same time, a memory watch mechanism is used to detect accesses to the local frame buffer by application software other than the display server.

If the memory watch mechanism detects that an application software other than the display server is accessing the local frame buffer, the system starts to use a continuous update mode. In the continuous mode, the frame buffer update is done periodically, for example 15 times per second. At the same time, the memory watch mechanism is used to periodically, for example 1 time per second, detect if the application which has accessed the local frame buffer is still accessing it. When it is detected that the application is no longer accessing the local frame buffer, the system switches back to said selective update mode. This results in the system being in selective update mode during stand-by.

The schedule of switching between two different modes of updating according to the origin of the present signal may be extended, e.g., if a specific application transfers a "period of updating"-signal to the update hardware, to always achieve the best updating period.

Advantageously, the method further comprises the steps of: activating a timer, if a change in the display information stored in the local frame buffer is detected, re-setting the timer if a change in the display information stored in the local frame buffer is detected while the timer is active, and updating the display frame buffer when the timer reaches a predetermined value.

When the memory watch mechanism detects first access to the local frame buffer, a hardware timer is programmed to run for a predetermined delay, for example 1 ms. When the memory watch mechanism detects further accesses to the local frame buffer, the timer is reset. When the timer expires, there has been no access for 1 ms. The application which has accessed the local frame buffer has therefore performed all the accesses for that screen update. The hardware performs the frame buffer update. The timer period can be predetermined, or be determined by the ASIC itself in a separate optimization process.

Both preferred methods can be combined in an advanced mixed method using the origin of a signal and a timer to improve the usability. For example, the sole use of an independent timer controlled update hardware would lead to several update procedures dependent from the setting of the timer. This would increase the number of display buffer updates in the "selective mode", by the product of timer delay and period of updating.

According to another aspect of the present invention, a computer program for carrying out the method for screen buffer update is provided, which comprises program code means for performing all of the steps of the preceding description when said program is run on a computer, a network device, a mobile terminal, or an application specific integrated circuit.

According to yet another aspect of the invention, a computer program product is provided comprising program code means stored on a computer readable medium for carrying out the method for screen buffer update of the preceding description when said program product is run on a computer, a network device, a mobile terminal, or an application specific integrated circuit.

According to yet another additional aspect of the present invention, an application specific integrated circuit is provided, which is capable of running software and including a local frame buffer and a display interface, characterized by a hardware means, adapted to detect changes in said local frame buffer and being connected to both said local frame buffer and said display interface.

The invention further encompasses to have a hardware block or hardware means inside the ASIC to detect the accesses to the local frame buffer. When an application program modifies the local frame buffer there is a need to perform an update from the local frame buffer to the display frame buffer in order to make the change visible on the display. The invention provides for a hardware means, e.g. a hardware block to detect accesses to local frame buffer. The detected access information can be passed to a display server application, or some means for the display server to perform the frame buffer update. Typically a specific process called display server, performs the changes to the local frame buffer. In such cases, the display server can also trigger the frame buffer update after it has changed the contents of the local frame buffer. Since performing all display change operations through the display server is slow, some programs access (change) the local frame buffer directly. Typical examples of such programs are games. In these cases the display server is not notified about the need of a frame buffer update. Alternatively, the information about the accesses can be handled by hardware, allowing the frame buffer update to be performed without any software involvement.

Previous solutions have provided to perform the frame buffer update periodically, regardless if the contents have changed. Also, the direct local frame buffer access has not been used widely.

Conveniently, the hardware means comprises means to pass information about accesses to said local frame buffer to a display server software running on said application specific integrated circuit and means to said display server software to perform an update of a frame buffer connectable to said display interface. This preferred embodiment of the present invention is a standard software solution for the frame buffer update method.

Preferably, the hardware means comprises means to detect if a change in the local frame buffer is originated by an application software running on said application specific integrated circuit. By knowing the origin of the change the hardware means can decide if a periodical update of the display frame buffer is required or not. A possible implementation is to have two frame buffer update modes, continuous and selective. By default, the system is in selective update mode. In selective mode the display server triggers the frame buffer update when it has changed the contents of the local frame buffer. At the same time memory watch mechanism is used to detect accesses to the local frame buffer by applications other than the display server. If an application other than the display server is accessing the local frame buffer, the system starts to use continuous update mode.

Advantageously, said hardware means comprises timer means, operable by changes detected in said local frame buffer, and means to perform an update of a frame buffer connectable to said display interface. The timer means can be activated, if the hardware means detect a change in the local frame buffer, e.g., for delaying display frame buffer update for a predetermined time. If the timer is active, the means to perform an update, the term of the timer, as well as the period of updating can be predetermined, or be optimized by additional hardware or software means. The timer means can be a timer circuit, or a counter, or the like. A second timer may be used to ensure a display frame buffer update within preset periods. This can be useful to prevent a certain application from continuously changing the content of the local frame buffer. Continuous changes in the content of the local frame buffer keep the resetting the timer for longer periods, preventing the display frame buffer from being updated. The second timer can be preset to a period related to the time resolution of the human eye. With a time period of the second timer about 20 ms a user can't detect the presence of the first timer, even if an application keeps changing the content of the local frame buffer incorrectly.

A sole use of a timer can result in an additional time lag if the display server is accessing the local frame buffer. The best results can be expected, if the ASIC or the hardware means comprises timer and transfer means to enable the ASIC to perform an advanced mixed display frame buffer update method as described in the description of the method.

According to yet another-additional aspect of the present invention, a mobile electronic device is provided, which comprises a display module with an integrated display frame buffer and an application specific integrated circuit as described in the foregoing description. The electronic device can be a computer, a network device as mobile terminal.

In the following, the invention will be described in detail by referring to the enclosed drawings in which.

Figure 1:
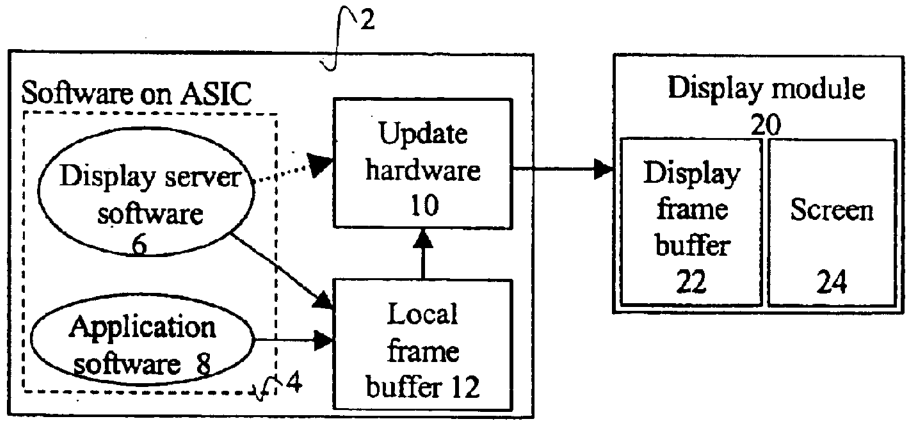
FIG. 1 shows a block diagram of an electronic device with an ASIC and a smart display.

FIG. 1 shows the main components of a device in accordance with the invention. The display screen 22 and the display frame buffer 22 integrate the display module 20. Other parts of the display module 20 are not shown.

On the application specific integrated circuit 2 (ASIC) there are provided the local frame buffer 12 (a memory) and the frame buffer update hardware 10 (display interface hardware). Software 4 is running on the ASIC, whereas the relevant components are the display server 6 and the application 8 software. Thick arrows show the data flow between the components while the dotted arrow show the control.

Display server 6 and application 8 software write data to the local frame buffer 12. The display server 6 controls the frame buffer update hardware 10, which transfers data from the local frame buffer 12 to the display frame buffer 22. The display module 20 handles the update from display frame buffer 22 to the screen 24.

Future displays with bi-stable matrix display elements would decrease the number of required updating cycles significantly. This may be achieved by additional data describing the changes in the actual displayed frame.

Figure 2:
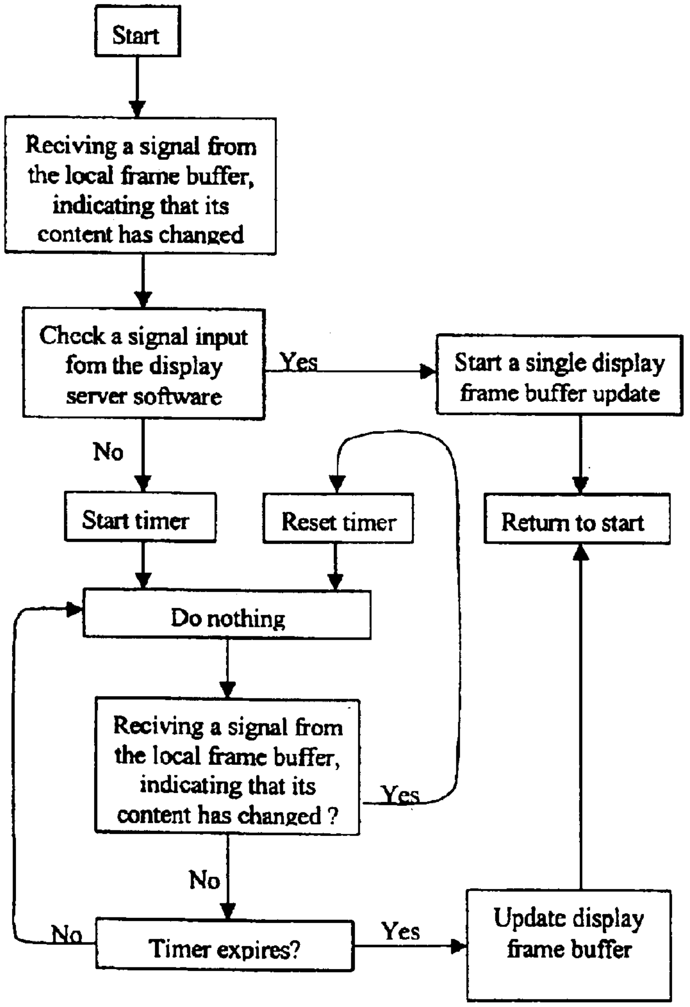
FIG. 2 shows a flowchart of the display buffer updating method according to one aspect of the present invention.

FIG. 2 shows a flowchart of the display buffer updating method according to one aspect of the present invention. The flowchart show the steps and decisions which can be used to receive a minimum in display buffer updates. In the first step the process is started, and the system waits for a signal from the local frame buffer indicating that the currently saved frame has changed. The signal indicates that the contents of the local frame buffer has changed, and therefore, the display frame buffer has to be updated. The update hardware checks the presence of a signal from the display server software, indicative that the display server software is actually changing the local frame buffer content. If the signal is present, the update hardware updates the display frame buffer once, and then returns to the beginning.

If the update hardware cannot detect a signal from the display server software, the update hardware starts a timer. As long as the timer is active, the update hardware will delay the display frame buffer update. When the update hardware receives a next signal indicative that the content of the local frame buffer has been changed while the timer is active, the timer is reset. Then the update hardware further delays the display frame buffer update, for the additional timer period. If the timer expires, the update hardware updates the display frame buffer once, and then returns to the beginning. Then the update hardware waits for the next signal from the local frame buffer when the contents thereof has changed.

Figure 3:
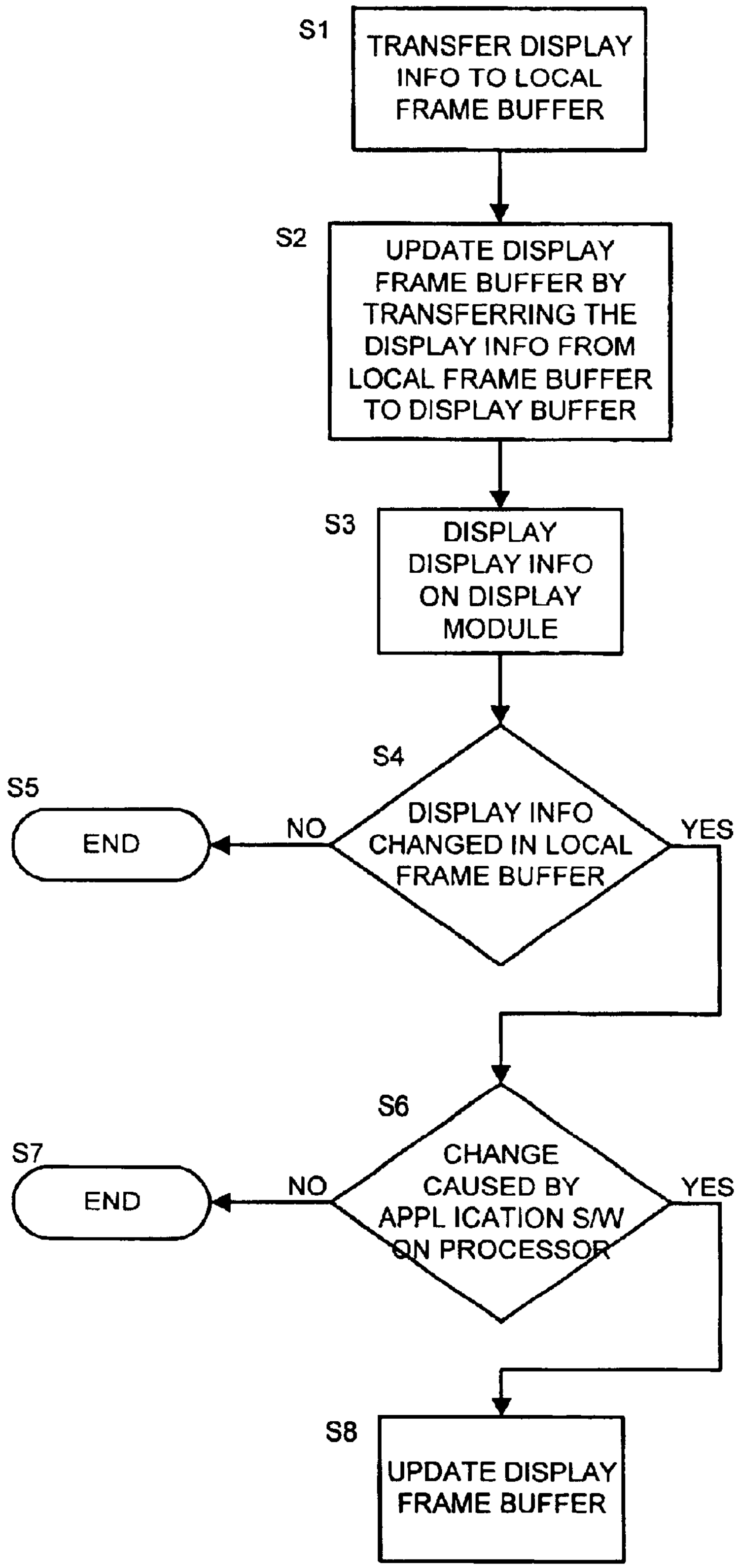
FIG. 3 shows a flowchart of a process for updating an integrated display frame buffer according to an example embodiment of the present invention.

FIG. 3 shows a flowchart of a process for updating an integrated display frame buffer according to an example embodiment of the present invention. Display information is transferred to a local frame buffer, S1. A display frame buffer is updated by transferring the display information from the local frame buffer to the display frame buffer, S2. The display information is displayed on a display module, S3. It is then determined if there have been any changes of the display information stored in the local frame buffer, S4, and if not, the process ends S5. If there have been any changes of the display information stored in the local frame it is then determined if the change in the display information is caused by an application software running on a processor, S6, and if not, the process ends S7. If the change of the display information is caused by the application software, the display frame buffer is updated, S8.

The combined method has the advantage, that the system updates the display frame buffer only once, if the content is changed by the display server software, and if an application software stopped rapidly changing the content of the local frame buffer.

This application contains the description of implementations and embodiments of the present invention with the help of examples. It will be appreciated by a person skilled in the art that the present invention is not restricted to details of the embodiments presented above, and that the invention can also be implemented in another form without deviating from the characteristics of the invention. The embodiments presented above should be considered illustrative, but not restricting. Thus the possibilities of implementing and using the invention are only restricted by the enclosed claims. Consequently various options of implementing the invention as determined by the claims, including equivalent implementations, also belong to the scope of the invention.

What is claimed is:

1. A method for updating an integrated display frame buffer of a display module in a mobile electronic device, said device comprising a local frame buffer and a processor, comprising the steps of:

transferring display information to said local frame buffer, updating said display frame buffer by transferring said display information from said local frame buffer to said display frame buffer, wherein said updating of said display frame buffer comprises the steps of:

detecting changes of said display information stored in said local frame buffer, determining if the change in the display information is caused by display server software running on said processor, selectively updating said display frame buffer, if the change of said display information is caused by said display server software;

determining if the change in the display information is caused by an application software accessing said local frame buffer other than said display server software; and continuously updating said display frame buffer only if the change of the display information is caused by said application software, the continuous updating terminating when said application software no longer accesses said local frame buffer.

2. The method for updating an integrated display frame buffer according to claim 1, wherein said updating of said display frame buffer comprises the steps of:

activating a timer if a change in the display information stored in said local frame buffer is detected;

re-setting said timer if a change in the display information stored in said local frame buffer is detected while said timer is active; and performing said updating of said display frame buffer if said timer expires.

3. Computer program for executing a display frame buffer update method in an electronic device, comprising program code means for carrying out the steps of claims 1 or 3 when said computer program is run on a computer, a network device, a mobile terminal, or an application specific integrated circuit.

4. An application specific integrated circuit, capable of running software and including a local frame buffer and display interface, comprising a hardware means adapted to detect changes in said local frame buffer and connected to both said local frame buffer and said display interface, and further comprising means to detect if a change in the local frame buffer is originated by a display server software running on said application specific integrated circuit or an application software other than said display server software.

5. The application specific integrated circuit, according to claim 4, characterized in that said hardware means comprises means to pass information about accesses to said local frame buffer to said display server software running on said application specific integrated circuit, and means to transfer the content of the local frame buffer to said display interface.

6. An electronic device, comprising a display module with an integrated display frame buffer and an application specific integrated circuit as claimed in claim 5.

7. The application specific integrated circuit, according to claim 4, characterized in that said hardware means comprises:

timer means, operable by changes detected in said local frame buffer, and means to transfer the content of the local frame buffer to said display interface.

8. The electronic device, comprising a display module with an integrated local frame buffer and an application specific integrated circuit as claimed in claim 7.

9. The electronic device, comprising a display module with an integrated display frame buffer and an application specific integrated circuit according to claim 4.

* * * * *